UNITED STATES PATENT OFFICE.

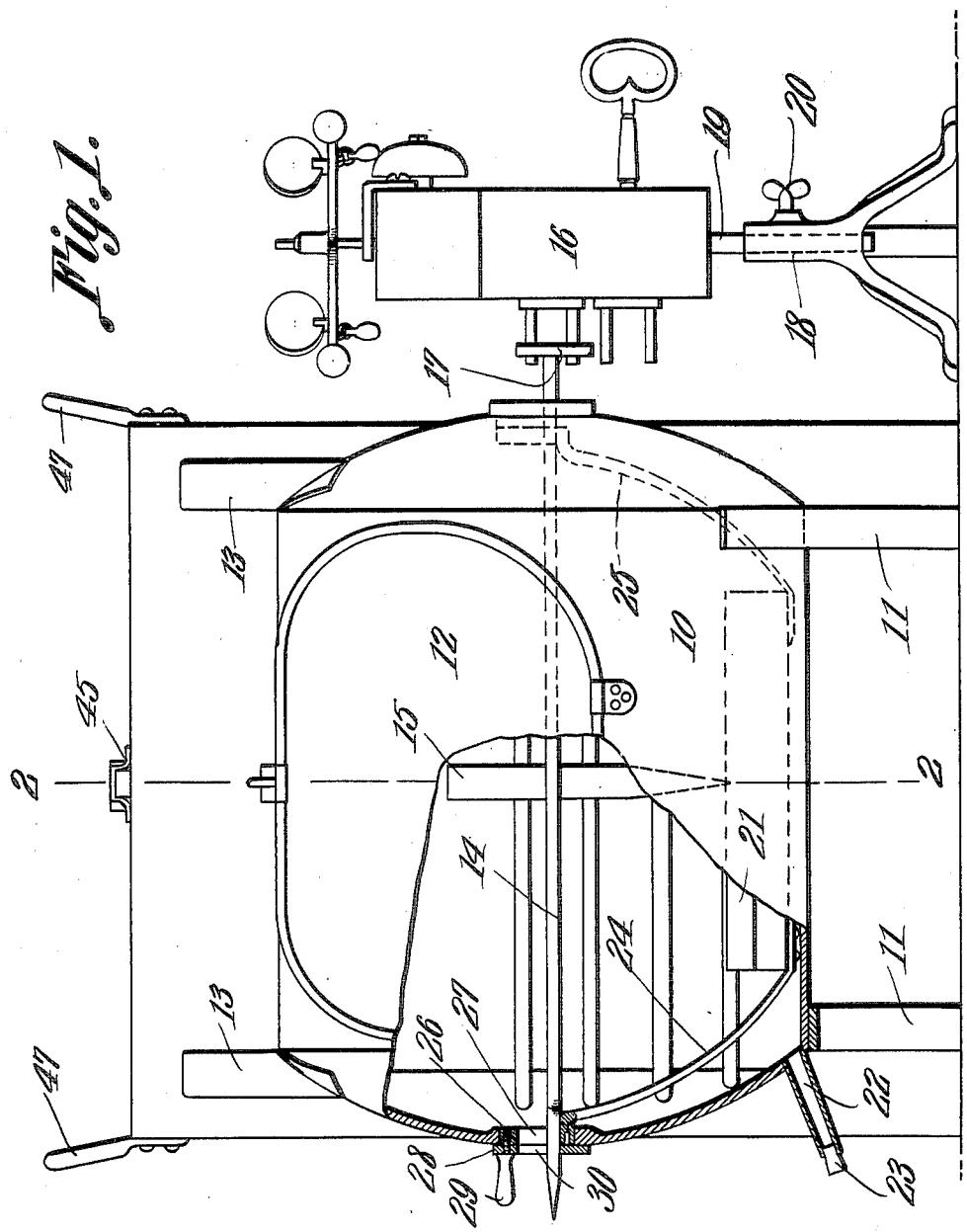

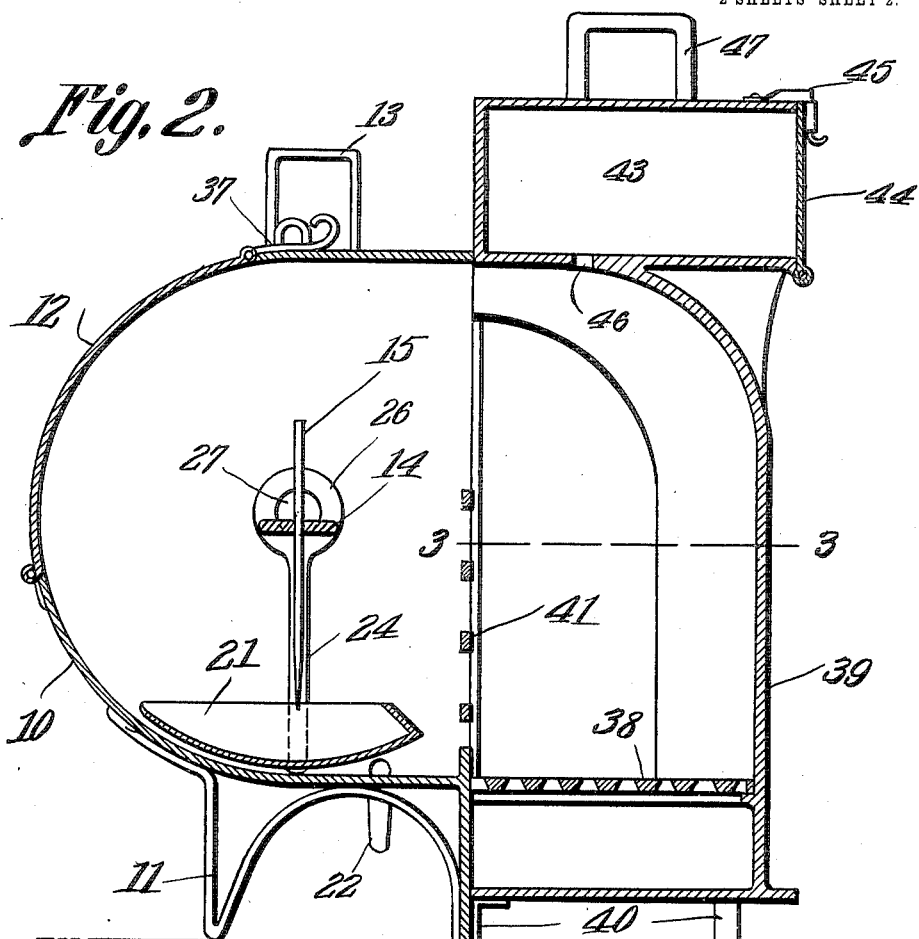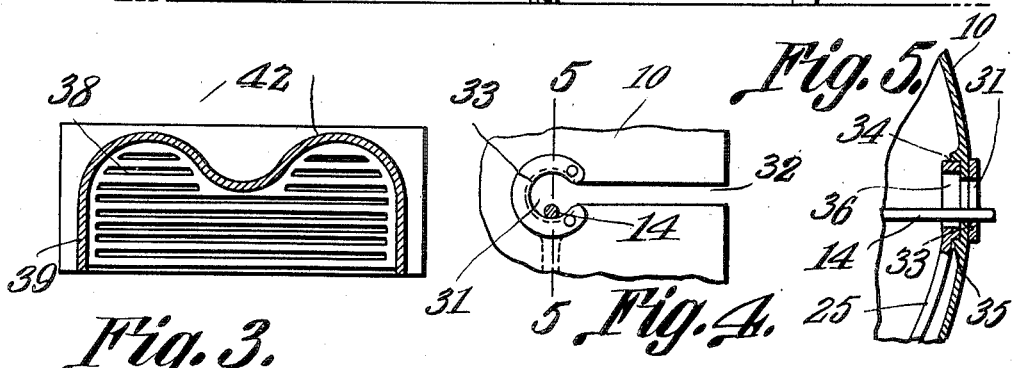

HERMANN KLEIN, OF MILWAUKEE, WISCONSIN.

MEAT-ROASTING APPARATUS.

1,051,502. Specification of Letters Patent. Patented Jan. 28, 1913.

Application filed August 25, 1910. Serial No. 578,941.

*To all whom it may concern:*

Be it known that I, HERMANN KLEIN, a citizen of the United States, residing at Milwaukee, in the county of Milwaukee and State of Wisconsin, have invented a new and useful Meat-Roasting Apparatus, of which the following is a specification.

This invention has for its object to provide a novel and improved apparatus for roasting meats, fowls, etc., means being provided for automatically rotating the meat or fowl during the process of roasting.

The invention also has for its object to provide an improved basting device, together with a novel combination and arrangement of parts to be hereinafter described and claimed.

A further object of the invention is to provide an apparatus of the kind stated which is portable, an oven, and a grate being provided, and said parts being separable.

In order that the invention may be better understood, reference is had to the accompanying drawings forming a part of this specification, in which drawings—

Figure 1 is a front elevation of the apparatus, partly in section. Fig. 2 is a cross section on the line 2—2 of Fig. 1. Fig. 3 is a horizontal section on the line 3—3 of Fig. 2. Fig. 4 is an end view of a fragment of the oven showing the bearing for the rotatable spit. Fig. 5 is a vertical section on the line 5—5 of Fig. 4.

As shown in the drawings, the apparatus consists, essentially, in an oven containing a rotatable spit and basting device, an open grate for furnishing the heat for the roasting operation, and a spring motor for rotating the spit. The oven comprises a casing 10 supported on legs 11, and entirely open on one side so that the heat from the grate may pass into the casing, said casing, when in use, being positioned so that its open side faces the grate, and fits closely thereagainst. The side of the casing opposite the grate is provided with a door 12 to permit inspection of the meat while the roasting operation is going on. The top of the casing is provided with suitable handles 13.

Extending longitudinally through the casing 10, is a spit 14 on which the meat is impaled, it being fastened thereto by a transverse pin 15 passing through an opening in the spit intermediate the ends thereof. The spit is rotatable during the roasting operation, a motor 16 being provided for this purpose. The motor is of the ordinary spring type, and is fitted with two different speed gears, and also with a speed regulator and an automatic alarm in case it becomes unwound. Inasmuch as such a motor is common and no claim is made for the same, a detailed description thereof is deemed unnecessary. One end of the spit carries a suitable coupling 17 for connection with the motor. A stand 18 supports the motor, the latter being vertically adjustable so that the coupling 17 may be applied to either one of the speed gears. A stem 19 extends from the bottom of the motor casing, which stem passes through an opening in the stand, and is locked therein by means of a set screw 20.

At 21 is indicated a scoop for catching the juice or gravy running from the meat during the roasting operation, said scoop being located below the spit 14. The bottom of the casing 10 is provided with a suitable outlet 22 through which any gravy or juice dropping into the casing, may be removed. The outlet is provided with a suitable closure 23. The scoop 21 is supported by curved arms 24 and 25 respectively, secured to the ends thereof, and extending in the direction of the end walls of the casing, the scoop being thus mounted in the casing so as to extend longitudinally with respect thereto. The extremity of the arm 24 is formed with an enlargement 26 which is circular, and is mounted in an opening in the end wall of the casing. This enlargement has an eye 27 through which one end of the spit 14 loosely passes. The enlargement 26 extends through the opening in the end wall of the casing, to the outside thereof, and is fitted on the outside with a disk 28 to which is attached a handle 29. The disk has an opening 30 through which the end of the spit also passes. The other end of the spit passes through an opening 31 made in the corresponding end wall of the casing 10, from which opening a slot 32 extends to the open side of the casing. On the outside of this end wall of the casing is secured a strip 33 surrounding the opening 31, to provide an additional bearing support for the end of the spit. This strip does not extend across the slot 32, so that a free passage-way is had from the open side of the casing to the opening 31 by means of said slot. The extremity of the arm 25 is formed with a circular enlargement 34 which is supported within an annular shoulder 35 surrounding the opening 31 on the inside of the casing. The enlargement 34 is cut open and has an eye 36 through which the end of the spit loosely passes.

In operation, the spit is removed from the casing by being moved in the direction of its length until one of its ends is withdrawn from the openings 27 and 30, after which the other end of the spit is moved out of the opening 31 by the way of the slot 32. The arm 25 is sufficiently resilient so that it may be sprung to pass out of the casing. The meat, fowl, or other article to be roasted is now impaled on the spit, and the latter is returned to the casing by a reversal of the herein described operation. The meat is held in place on the spit by sticking the pin 15 through the meat and the opening in the spit. The spit is now coupled to the motor 16, whereupon the meat is automatically rotated. The juice and gravy dropping off the same is caught in the scoop 21, and at suitable intervals, said pan will be swung through the arc of a circle by means of the handle 29, so as to come into position above the meat, whereupon the juice and gravy are poured over the same. The meat may be thus basted until it is done. The progress of the roasting operation may be observed by opening the door 12, the latter being provided with a suitable catch 37 for holding it closed. The scoop operates independently of the spit, and does not rotate therewith, the spit rotating automatically, whereas the scoop is rotated manually.

The grate is indicated at 38, it being mounted in a casing 39 mounted on legs 40. The casing 39 is open on one side, and when in use, this open side will be placed against the open side of the casing 10. Across the open side of the casing 39 extend fender bars 41 for preventing the fuel from dropping into the casing 10. The fuel employed will usually be charcoal. The rear wall of the casing 39 is formed with two depressions 42 as shown in Fig. 3, and on the top of the said casing is mounted an oven 43 which may be employed for roasting potatoes, etc. This oven is provided with a hinged door 44 provided with a suitable locking device 45 for holding the same closed. The bottom of the oven 43 has an opening 46 into the casing 39, and to the ends of the oven are attached handles 47 to facilitate the carrying about of the grate casing.

By the apparatus herein described, meats, fowls, etc., can be quickly and economically roasted, and as the apparatus is portable, it may be stored away when not in use. Inasmuch as the oven and the heating device thereof are separable, all the parts are readily accessible, and they will also take up less room when stored away.

What is claimed is:

1. An oven having openings in its ends, one of said openings having an annular shoulder arranged therearound, and a gravy-receiving scoop suspended within said oven and provided with arms having circular enlargements, one of said enlargements being received and rotatable within one of said openings, said enlargement having fixed thereto a disk, in turn, provided with a manually operated member, by means of which and said circular enlargements together with said arms, said scoop may be rotated, the opposite enlargement being rotatable within said annular shoulder.

2. An oven having openings in its ends, one of said openings having an annular shoulder arranged therearound, a gravy-receiving scoop suspended within said oven and provided with arms having circular enlargements, one of said enlargements being received and rotatable within one of said openings, said enlargement having fixed thereto a disk provided in turn with an eye and with a manually operated member, by means of which and said circular enlargements, together with said arms, said scoop may be rotated, the opposite enlargement being rotatable upon said circular shoulder, and a spit arranged within said oven, the ends of which spit are received by said openings and said circular enlargements, disk and shoulder, and means for actuating said spit.

3. An oven of the type described having openings in its end-portions, one of said end-portions having an annular shoulder upon its inner surface and an annular bearing upon its outer end face, said shoulder and bearing surrounding one of said end-openings, a gravy-receiving scoop suspended within said oven and having suspending arms provided with circular enlargements received within said shoulder and one of said openings, respectively, one of said enlargements having fixed thereto an apertured disk, received by the other of said end-openings, said disk having fixed to it a manually actuated member, a spit arranged within said oven and having its ends extending through the enlargements of said scoop-suspending arms and said end-openings, and bearing in one of said scoop-suspending arms and said annular bearing, and means for actuating said spit.

In testimony that I claim the foregoing as my own, I have hereto affixed my signature in the presence of two witnesses.

HERMANN KLEIN.

Witnesses:
 HERMANN PIETSCH,
 H. L. GRIEB.